(12) United States Patent
Rosefsky

(10) Patent No.: US 6,357,997 B1
(45) Date of Patent: Mar. 19, 2002

(54) RIBBON DRIVE POWER GENERATION APPARATUS AND METHOD

(76) Inventor: Jonathan B. Rosefsky, 251 W. Montgomery Ave., Haverford, PA (US) 19041

( * ) Notice: Subject to any disclaimer, the term of this patent is extended or adjusted under 35 U.S.C. 154(b) by 0 days.

(21) Appl. No.: 09/628,786

(22) Filed: Jul. 29, 2000

Related U.S. Application Data

(60) Provisional application No. 60/146,122, filed on Jul. 29, 1999.

(51) Int. Cl.[7] .............................................. F04D 25/16
(52) U.S. Cl. ............................. 415/60; 415/72; 415/73; 415/75; 415/131; 416/177
(58) Field of Search .............................. 415/60, 71, 72, 415/73, 75, 129, 130, 131, 908; 416/128, 176, 177

(56) References Cited

U.S. PATENT DOCUMENTS

| | | | |
|---|---|---|---|
| 119,155 A | 9/1871 | Kolb | |
| 471,671 A | 2/1892 | Stants | |
| 475,826 A | 5/1892 | Street | |
| 815,302 A | * 3/1906 | Marvin | 415/75 |
| 1,816,971 A | * 8/1931 | Hoff et al. | 415/75 |
| 2,334,302 A | * 11/1943 | Akins | 415/75 |
| 2,568,903 A | 9/1951 | Vassar | 115/34 |
| 2,656,809 A | 10/1953 | Frasure | 114/151 |
| 3,070,061 A | 12/1962 | Rightmyer | 115/34 |
| 3,141,439 A | 7/1964 | Liston | 115/16 |
| 3,482,402 A | 12/1969 | Anthoney, Sr. | 60/221 |
| 4,151,081 A | * 4/1979 | Bolli et al. | 210/83 |
| 4,222,231 A | 9/1980 | Linn | 60/39.45 |
| 4,317,330 A | * 3/1982 | Brankovics | 60/398 |
| 4,373,919 A | 2/1983 | Strangeland | 440/47 |
| 4,496,282 A | * 1/1985 | Gokhman | 415/161 |
| 4,500,259 A | * 2/1985 | Schumacher | 416/122 |
| 4,634,389 A | 1/1987 | Eptaminitakis | 440/53 |
| 5,139,391 A | * 8/1992 | Carrouset | 415/74 |
| 5,181,868 A | 1/1993 | Gabriel | 440/38 |
| 5,240,374 A | 8/1993 | Speer | 416/140 |
| 5,244,425 A | 9/1993 | Tasaki et al. | 440/47 |
| 5,292,270 A | 3/1994 | Tucker et al. | 440/82 |
| 5,324,216 A | 6/1994 | Toyohara et al. | 440/47 |
| 5,383,802 A | 1/1995 | Nicholson | 440/38 |
| 5,417,597 A | 5/1995 | Levendahl | 440/6 |
| 5,558,509 A | 9/1996 | Jirnov et al. | 418/15 |

FOREIGN PATENT DOCUMENTS

| | | |
|---|---|---|
| DE | 298 12 429 | 7/1999 |
| FR | 490.000 | 11/1917 |
| FR | 757.930 | 5/1932 |
| FR | 775.605 | 6/1934 |
| FR | 2160692 | 10/1971 |
| FR | 2 749 558 | 12/1997 |
| JP | 5-294282 | 5/1993 |
| JP | 6-191482 | 6/1994 |
| WO | WO 87/01353 | 12/1987 |
| WO | WO 95/23088 | 8/1995 |
| WO | WO 95/24562 | 9/1995 |

* cited by examiner

*Primary Examiner*—Edward K. Look
*Assistant Examiner*—Ninh Nguyen
(74) *Attorney, Agent, or Firm*—Roberts Abokhair & Mardula, LLC

(57) ABSTRACT

A ribbon drive power generation system and method is disclosed. The system is equipped with an extended tube having an intake at a first end and an outlet at a second end. A ribbon formed of helical coils is mounted in the tube for rotation and the frequency of the coils increases from the first end to the second end of the tube. Moving water is directed into the first end, an axial component of momentum of the water is decreased via the rotating ribbon, and the rotation is used to induce electricity or drive an electrical generator. The scalability and modular nature of the present invention allow flexible implementation.

16 Claims, 3 Drawing Sheets

RIBBON DRIVE POWER GENERATION APPARATUS AND METHOD

RELATIONSHIP TO PRIOR APPLICATIONS

This application claims the benefit of U.S Provisional Application No. 60/146,122, filed Jul. 29, 1999.

FIELD OF THE INVENTION

This invention relates generally to an apparatus for producing hydroelectric power using a ribbon drive mechanism. More particularly, the present invention is a ribbon drive shaped as a spiral ribbon over a cylinder for causing incoming water to turn the axle upon which the ribbon drive is mounted, thereby imparting motion to a number of possible means of electrical power generation.

BACKGROUND OF THE INVENTION

The United States and other countries are facing an ever increasing spiral of demands for electric power. Coal powered electric power generation facilities, while relatively cost-effective, nevertheless present a number of adverse environmental issues from an air and water standpoint as well as from a mining standpoint. Nuclear powered electric power generation facilities, while capable of producing significant amounts of electric power, are extremely expensive to build and to operate and represent, to many communities, the ever present danger of a Three Mile Island/Chernobyl type nuclear catastrophe with all of its associated environmental hazards and life-threatening situations.

Solar power electric generation facilities, while promising from an environmental impact standpoint, are unlikely to be able to generate significant portions of the vast amounts of power needed presently and in the future given the present state of this particular technology.

Hydropower generation offers one of the more promising power generation opportunities through its use of a renewable resource. However, current hydropower generation techniques involve: the expenditure of vast amounts of capital to construct large dams; the flooding and rendering unusable of large areas of land to contain the vast amounts of water required for this type of power generation. In addition, insufficient water depth, water volume, and speed of water flow are factors which significantly limit the areas in which current hydropower generation can be employed. With these limitations in mind, there are numerous areas of the country and of the world which have water resources that could be used to generate hydropower in large amounts if these impediments could be overcome.

One method of overcoming these impediments is to pump water from low areas to higher areas of elevation to allow the water to be concentrated in a series of relatively small reservoirs to allow the energy of falling water to be harnessed for hydropower generation purposes. The current technology of power generation devices is dependent on large bodies of water to supply the energy and it would be virtually impossible for such devices to take advantage of this reservoir concept in order to broaden their list of possible power generation sites. Clearly, there is an acute need for the development of new hydropower generation techniques that will support the employment of generation facilities previously not considered viable for this type of effort. Hydropower generation systems have long been the subject of various inventions. For example, U.S. Pat. No. 5,451,137 to Gorlov was issued for a reaction turbine. The turbine was comprised of a working wheel with a plurality of airfoil-shaped blades mounted transversely to the direction of fluid flow for rotation in a plane parallel to the fluid flow located in a tubular conduit. The blades were arranged in a helical configuration which ensured that a portion of the blades were always positioned perpendicular to the fluid pressure thereby ensuring a continuous speed of rotation with no accelerations or decelerations. However, the frequency of the repeating blades remained constant throughout the length of the conduit.

U.S. Pat. No. 5,997,242 was issued to Hecker et al. for a hydraulic turbine. This invention disclosed a rotatable turbine runner with a circumferential inlet for receiving fluid and an axial outlet for discharging the fluid. The turbine also includes a conical-shaped hub rotatable about a central axis, the hub having a diameter that decreases in size from the inlet to the outlet, the conical-shaped hub including a base having a circumference adjacent to the inlet and a surface sloping inwardly toward the central axis. The turbine runner also includes at least two helical turbine blades connected to the conical-shaped hub, each turbine blade having a leading edge adjacent to the inlet, a trailing edge adjacent to the outlet, and a blade running the length therebetween having a pitch. However, once again, the frequency of the repeating blades remained constant throughout the length of the conduit.

U.S. Pat. No. 6,036,443 was issued to Gorlov for a helical turbine assembly operable under multidirectional gas and water flow for power and propulsion systems. The turbine was comprised of an array of helical turbine units or modules arranged, vertically or horizontally, to harness wind or water power. Each turbine unit or module was comprised of a plurality of helical blades having an airfoil profile. In one embodiment, a cylindrical distributor was provided to channel the fluid flow to the blades of the turbine. Again, the frequency of turbine blades remained constant throughout the length of the conduit.

While these various systems represent inventive approaches to hydropower generation, they do not overcome the limitations and impediments currently found in hydropower generation efforts, namely: the requirement for expenditure of vast amounts of capital to construct large dams; the flooding and rendering unusable of large areas of land to contain the vast amounts of water required for this type of power generation; and the restriction of power generation facilities to those areas having sufficient water depth, water volume, and speed of water flow to support hydropower generation using currently available technologies.

Therefore, what would be useful would be a system capable of overcoming these limitations and allowing hydropower generation at a lower cost of facilities construction, with less loss of land due to the flooding required, and able to operate in areas previously considered unsuitable for hydropower generation due to insufficient water depth, insufficient water volume, and/or insufficient speed of water flow.

The present invention is just such a system that differs significantly from the inventions discussed above. The present invention generally comprises a ribbon drive power generation apparatus enclosed in a containment tube, thereby giving an extremely focused flow of the water available upon the vanes of the ribbon drive power generation apparatus.

SUMMARY OF THE INVENTION

As discussed more fully below, the ribbon drive power generation apparatus consists of a ribbon-like curved shape, composed of metal or other suitable material, attached to a central axle with the complete apparatus being contained in a tube having a constant diameter for the length of the tube.

It is an object of the present invention to create a hydropower generation system that involves significantly decreased outlays of capital for facilities construction compared to that presently required.

It is a further object of the present invention to create a hydropower generation system that requires a significantly less volume of water for operation thereby resulting in decreased flooding and rendering unusable of large areas of land to contain the vast amounts of water required for current technologies to operate.

It is a further object of the present invention to create a hydropower generation system that will function in areas where water depth, water volume, and/or speed of water flow are insufficient to support current technology hydropower generation systems.

It is yet another object of the present invention to provide a system and method useful for enabling hydropower "peak shaving" of electrical power needs.

The ribbon drive generation apparatus of the current invention is comprised of a ribbon-like curved shape, composed either of metal or other suitable material, attached to a central axle with the complete apparatus being contained in a tube having a constant diameter for the length of the tube.

A key element of the present invention is that there is a change in the frequency of curves of the ribbon drive, which proceeds from a low frequency (few coils per unit length) at the leading portion of the apparatus to a high frequency (many coils per unit length) at the trailing portion of the apparatus. The apparatus looks similar to a corkscrew but has a decreasingly stretched frequency of coils as one proceeds down the length of the central axle. For example, in appearance, at the intake point for the water, the ribbon vane would present a gradual curve at an angle of approximately 30 degrees to the axial flow of the incoming water and changing/progressing to a tightly curved angle at the exit point for the water, with said angle being nearly perpendicular to the flow of water passing through the apparatus and thereby reducing the axial velocity of the water passing through the apparatus (this angle is not meant as a limitation to the apparatus since other angles may prove to be beneficial).

This reduction of axial velocity of the water is a consequence of a transfer of energy from the water to the apparatus, thus turning the central axle of the apparatus. The central axle of the apparatus operates within a containment tube to prevent loss of energy to the sides as would be the case with a typical open hydraulic turbine type design. The central axle of the apparatus could be attached to and used to power any of a number of means of electrical generation. Power could be transmitted from the central axle of the system to the means of electrical generation by the use of gears, pulleys, or any variety of combinations of techniques, or by electrical power induction from the peripheral vane edges utilizing methods such as, but not limited to, magneto-electric induction.

In areas having sufficiently high rate of water flow, the apparatus could be employed with the central axle being in a horizontal position and allowing the force of the natural current to power the apparatus. In areas having an insufficiently high rate of water flow but with sufficient vertical distance for the water source, the apparatus could be employed with the central axle being in a vertical position and allowing the force of gravity of the water to power the apparatus. Additionally, the device could be employed in multiple configurations either in parallel or in series based on the water source used to power the apparatus. For example, the apparatus could be employed in pairs, threes, fours, and so forth in a teaming arrangement with the number and configuration being dependent on the configuration of the water source unlike the current dam requirement for hydropower generation.

DETAILED DESCRIPTION OF THE INVENTION

Figure 1:
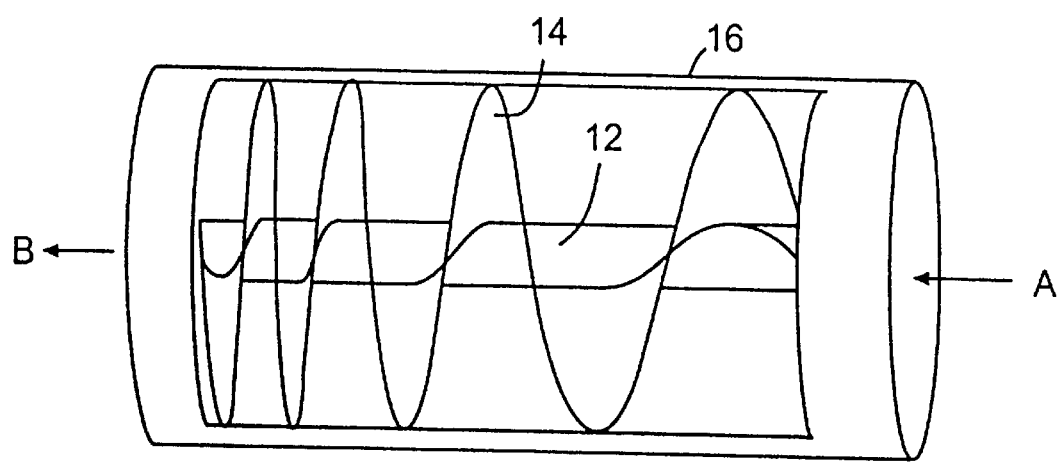
FIG. 1 illustrates the basic design of the power generation system of the present invention.

Referring to FIG. 1, the apparatus design is illustrated. The central axle 12 has a ribbon 14 attached to it. Visually, this representation appears much like the thread of a screw attached to a central core. The central design rotates within a containment tube 16. Water flows through the power generation system in the direction of the arrow as the entire corkscrew-like design rotates within the containment tube 16.

Water initially enters the containment tube 16 at point A and encounters the low frequency coils, which present a gradual curve of approximately 30 degrees to the axial flow of the incoming water. The ribbon changes, progressing to a tightly curved angle (high frequency coil) at the exit point for the water, with said angle at this point B being nearly perpendicular to the flow of water passing through the apparatus and thereby reducing the velocity of the water passing through the apparatus (this angle is not meant as a limitation to the apparatus since other angles may prove to be beneficial).

This reduction of velocity of the water is a consequence of a transfer of energy from the water to the apparatus, thus turning the central axle 12 and ribbon 14 of the apparatus. Rotation of the ribbon-like apparatus is initiated at the low-frequency coil, with energy incrementally transferred as water, hitting the initial low frequency coil, sets the apparatus spinning slowly, progressing gradually to higher frequency coils with resultant higher rotational speed, finally contacting the terminal high frequency, tightly-curved coil where maximal energy transfer occurs.

The central axle 12 of the apparatus operates within a containment tube 16 to prevent loss of energy to the sides as would be the case with a typical open hydraulic turbine type design. The central axle 12 of the apparatus could be attached to and used to power any of a number of means of electrical power generation. In this manner, power could be transmitted from the central axle 12 of the power generation apparatus to the means of electrical power generation by the use of gears, pulleys, or any of a variety of combinations of techniques. Alternately, the system could be configured to bypass the shaft and directly induce electricity, although this is still considered a "generator means" for the purposes of this disclosure.

The curved ribbon may be made of metal, plastic, composite or other sturdy material. The frequency of the ribbon may be fixed (static) or variable (dynamic or adjustable). It can be made variable by segmenting the ribbon into a contiguous length of hinged, interlocking, or overlapping blades, which are movable by reason of linkages or sliding splines (or other means to those skilled in the art) along the length of the ribbon band, or by linear elongation or contraction. The innermost central edge of the ribbon is attached to the central axle, which can include tubular sections that slide longitudinally or include slots within which the innermost edge attachment of the ribbon can be adjusted to slide, or by other methods. The material of the ribbon can have limited but finite flexibility/extensibility, to permit adjustment as the flow source varies.

Figure 2:
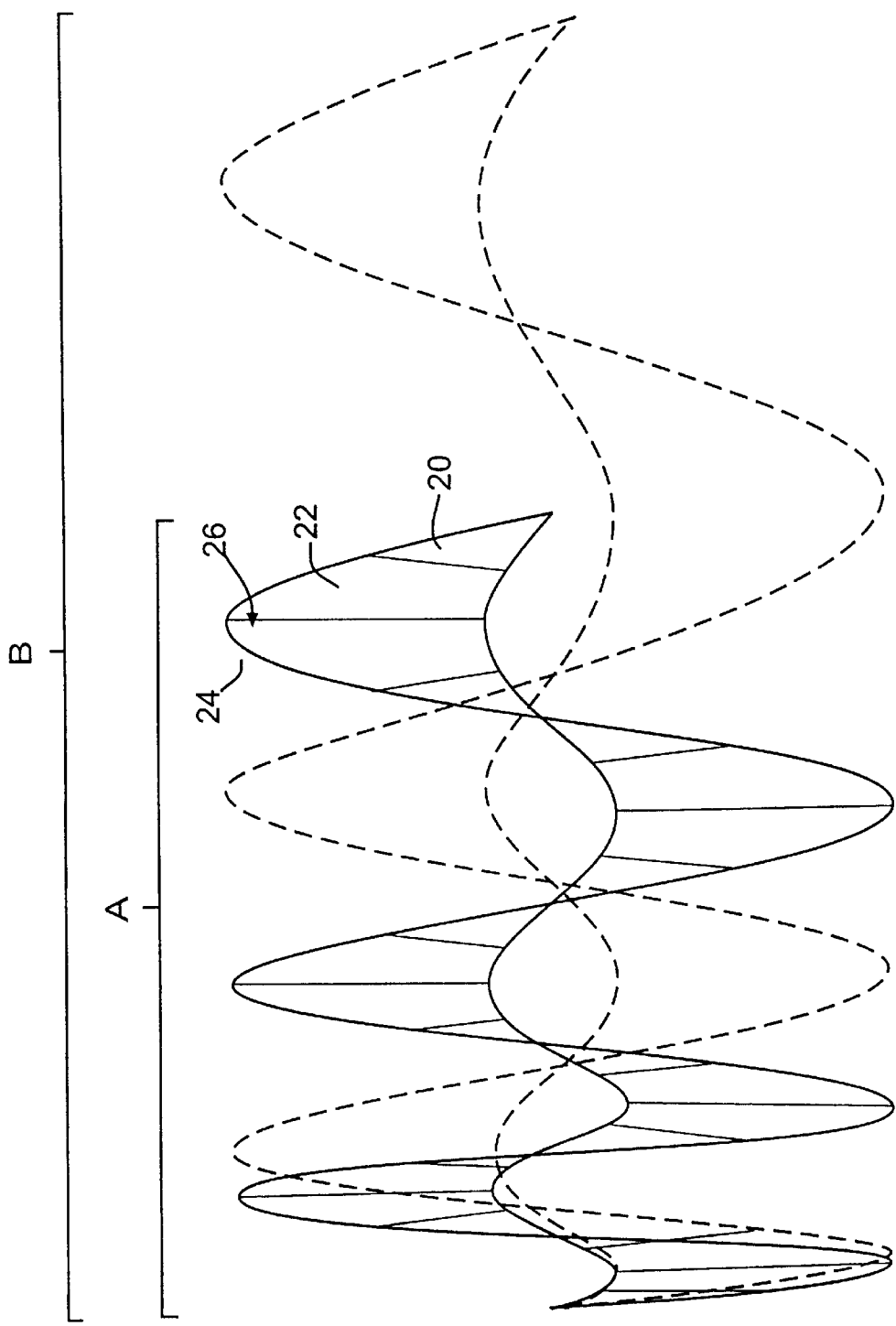
FIG. 2 illustrates an adjustable ribbon embodiment of the present invention.

Referring to FIG. 2, a variable or adjustable implementation of the ribbon for the present invention is illustrated. An adjustable ribbon, in the form of a series of blades 20, 22, 24, as it would extend through a containment tube (not shown) is illustrated. This ribbon could be used by having an axially adjustable attachment means on the central axle. These blades form the ribbon and proceed in a coil-like design, with the frequency of the coils increasing along the length of the axis in the direction of the water flow. The blades can be hinged, interlocking, or overlapping by any suitable means, as shown at 26, to form a unitary-type ribbon. The ribbon, shown as extending in this figure, starts at a first length A and can be adjusted to a second length B, as shown by the dashed lines, thereby having effectively lower frequency coils. This feature would allow fine-tuning of the ribbon based on variations in the flow of the water source.

Figure 3:
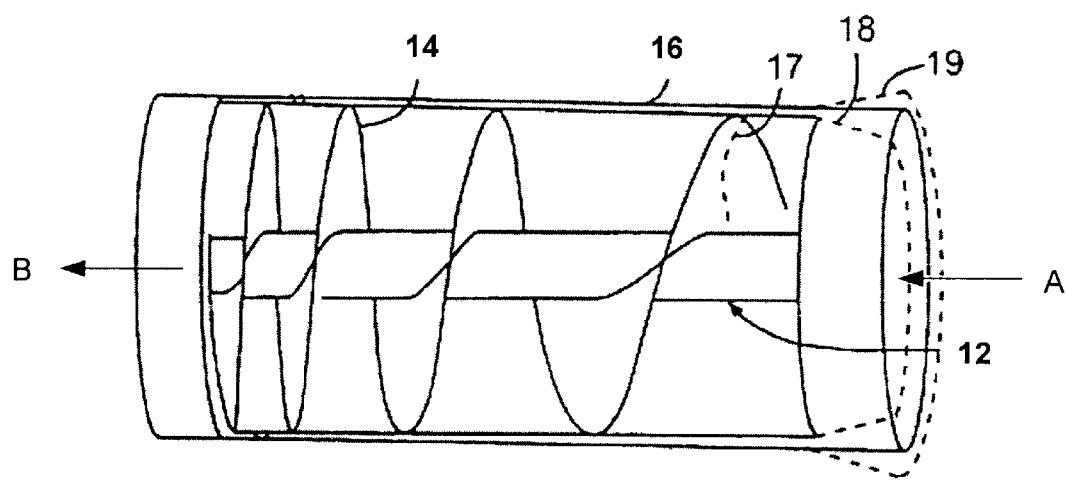
FIG. 3 illustrates a cupped ribbon and variable tube-size embodiment.
Figure 4:
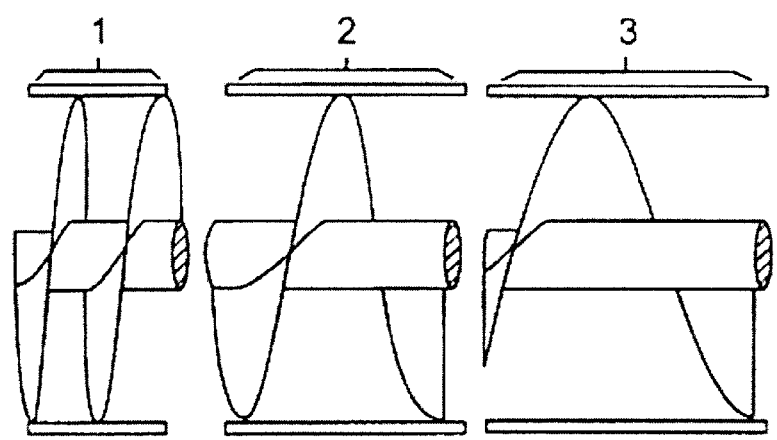
FIG. 4 illustrates a serial arrangement embodiment.

FIG. 3 illustrates the preferred cupped ribbon 17 having a concave curvature in a direction facing the inlet, constant diameters of shaft 12/tube 16, and varied tube diameter portions 18, 19. FIG. 4 illustrates an arrangement of plural serial sections 1, 2, and 3.

Although the ribbon is illustrated in FIGS. 1, 3, and 4 as extending to tube, one of ordinary skill in the art will understand that a small clearance must exist between the ribbon and tube so as to prevent interference.

The apparatus could be employed in a variety of sizes based on the particular space or configuration restrictions of the area(s) in which it would be employed. The apparatus could also be employed in a variety of teaming arrangements in pairs, threes, fours, and so forth as well as in parallel or series based on the specific requirements of a particular installation. This flexibility would allow hydropower generation efforts to be employed in areas previously deemed unsuitable for such activities due to insufficient water depth, insufficient water volume, and/or insufficient speed of water flow.

The scalability and modular nature of the present invention allow it to meet the objective of significantly decreased outlays of capital for facilities construction compared to that presently required by currently available technologies.

The scalability and modular nature of the present invention also allow it to meet the objective of requiring significantly less volume of water thereby alleviating the need for the extensive flooding and rendering unusable of large tracts of land to contain the vast amounts of water required for currently available technologies.

The scalability and modular nature of the present invention allow it to meet the objective of being capable of functioning in areas where water depth, water volume, and/or speed of water flow have previously been deemed insufficient to support hydropower generation efforts.

The progressively increasing frequency of the coils on the ribbon provide for the efficient transfer of linear energy to rotational energy along the entire length of the ribbon.

When used with small reservoirs, water can be pumped to the reservoirs during periods of low power usage. During periods of peak demand, the water can be released to operate the ribbon drive generator to assist in satisfying the power demand, thus providing "peak shaving" to existing power generation systems.

I claim:

1. A ribbon drive power generation system comprising:
    a tube having a substantially constant diameter, an intake at a first end, and an outlet at a second end;
    at least one rotatable ribbon formed of coils extending in a helical manner from the first end to the second end of the tube, wherein a frequency of coils per unit length of tube increases from the first end to the second end of the tube;
    a central, axial shaft having a substantially constant diameter in said tube, said ribbon being fixed at an inner edge to said shaft and extends radially outward to form an outer edge adjacent an inner wall of the tube; and
    generator means associated with said shaft and ribbon to convert rotation thereof into electrical power.

2. The ribbon drive power generation system of claim 1, comprising plural axially connected sections, each section having a shaft means and ribbon.

3. The ribbon drive power generation system of claim 1, comprising plural, parallel units, each unit having a separate ribbon.

4. The ribbon drive power generation system of claim 1, wherein said ribbon is cupped to have a concave curvature in a direction facing the inlet.

5. The ribbon drive power generation system of claim 1, wherein the ribbon is formed of rigid material selected from the group consisting of metal, composite materials, plastic polymer, and ceramic.

6. The ribbon drive power generation system of claim 1, wherein the tube or a portion varies in diameter.

7. The ribbon drive power generation system of claim 1, wherein plural ribbons are fixed on said shaft.

8. The ribbon drive power generation system of claim 1, further comprising means to adjust the length and coil frequency of the ribbon.

9. A ribbon drive power generation method comprising:
    providing a tube having a substantially constant diameter, an intake at a first end, an outlet at a second end, and an axially-located shaft having a substantially constant diameter;
    rotating at least one shaft-mounted ribbon formed of coils extending in a helical manner from the first end to the second end of the tube, wherein a frequency of coils per unit length of tube increases from the first end to the second end of the tube;
    directing moving water into the first end;
    decreasing an axial component of momentum of the water with the ribbon to cause rotation of the ribbon and shaft; and
    generating electrical power from said rotation.

10. The ribbon drive power generation method of claim 9, comprising providing plural axially connected sections, each section having a separate shaft and ribbon.

11. The ribbon drive power generation method of claim 9, comprising providing plural, parallel units, each unit having a separate tube, shaft, and ribbon.

12. The ribbon drive power generation method of claim 9, wherein the shaft is a central, axial shaft and said ribbon is fixed at an inner edge to said shaft and extends radially outward to form an outer edge adjacent an inner wall of the tube.

13. The ribbon drive power generation method of claim 9, further comprising
   providing a varied diameter to a minor portion of the tube.

14. The ribbon drive power generation method of claim 9, further comprising providing plural ribbons on said shaft.

15. The ribbon drive power generation method of claim 9, further comprising adjusting the length and frequency of the ribbon.

16. The ribbon drive power generation method of claim 9, further comprising
   moving water to a raised reservoir during periods of low power demand; and
   releasing water in said reservoir to produce hydropower during periods of high power demand.

\* \* \* \* \*